Patented June 15, 1937

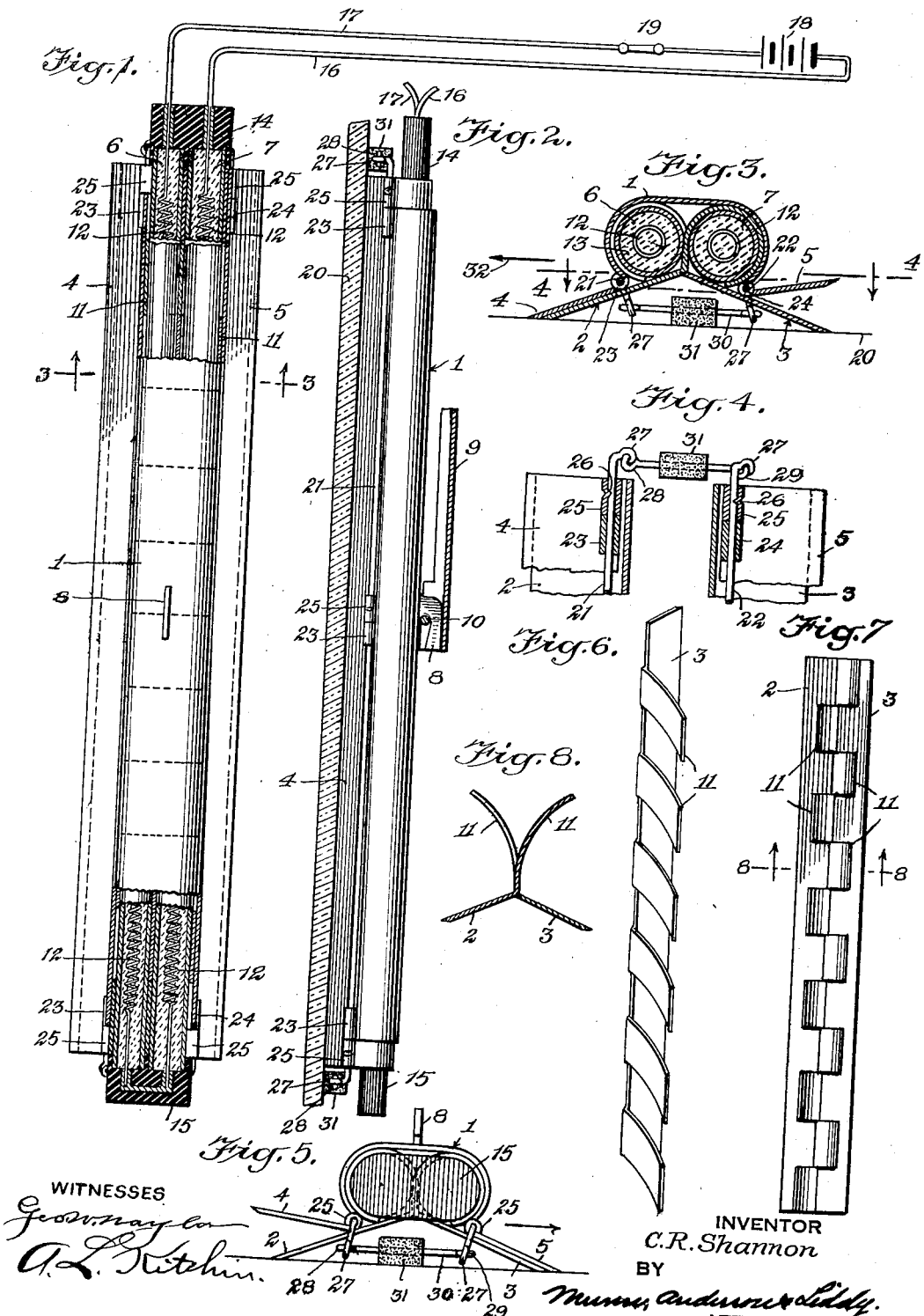

2,084,112

UNITED STATES PATENT OFFICE 2,084,112

CLEANING DEVICE

Charles R. Shannon, Harlan, Ky.

Application October 24, 1936, Serial No. 107,348

8 Claims. (Cl. 15—250)

This invention relates to cleaning devices for flat surfaces and one which may be used advantageously for cleaning the windshields of automobiles.

An object of the invention is to provide an improved construction which is comparatively simple and yet which produces a desirable cleaning operation on either a warm or cold flat surface.

Another object of the invention is to provide a cleaning device for windshields of automobiles which is adapted to effectively and quickly remove ice or frost therefrom.

An additional object, more specifically, is to provide a cleaning device for windshields or other surfaces wherein both heat and scraping action are secured simultaneously during the cleaning operation.

In the accompanying drawing:

Fig. 1 is a view partly in section and partly in elevation of a device embodying the invention, the same being shown in connection with a source of electrical current and suitable conducting wires;

Fig. 2 is a side view of the structure shown in Fig. 1 together with a piece of glass against which the device is placed;

Fig. 3 is a sectional view through Fig. 1 approximately on the line 3—3, the same being on an enlarged scale;

Fig. 4 is a sectional view through Fig. 3 approximately on the line 4—4;

Fig. 5 is an end view on an enlarged scale of the structure shown in Fig. 1;

Fig. 6 is a perspective view of one of the fixed scraping blades shown in Fig. 3;

Fig. 7 is a top plan view of the two fixed scraping blades before the upper part has been coiled;

Fig. 8 is an enlarged sectional view through Fig. 7 on the line 8—8.

Referring to the accompanying drawing by numerals, it will be evident that the device presents, generally speaking, a rigid bar 1, a pair of fixed scraping bars 2 and 3 and a pair of swinging scraping bars or blades 4 and 5. These various members are associated with heaters 6 and 7 and certain other parts which make the entire construction function as a unit. A hook 8 is welded or otherwise rigidly secured to the bar or casing 1 and a swinging arm 9 is interlocked with this hook through the action of pin 10. Arm 9 may be swung by any usual power element now in common use, as for instance an electric motor or a suction motor that are found in connection with automobile windshield wipers of the present day.

In cleaning flat surfaces, as for instance a windshield on an automobile, ordinarily a wiping member acts reasonably satisfactory in a rain, but where snow strikes the windshield or where the rain freezes on the windshield difficulties arise. In the present invention means have been provided for cleaning a windshield when rain is deposited thereon or when snow or ice forms thereon. As indicated in Figs. 6 to 8, the scraping bars or scrapers 2 and 3 are each provided with spaced bendable extensions 11 which are bent around as shown in Fig. 3 so as to enclose and pinch to a certain extent the heaters 6 and 7 whereby these heaters are held in position. It will be understood that these heaters are each provided with a heating coil 12 surrounded by asbestos or other insulation 13. At the ends of the heaters there are provided insulating caps 14 and 15 and through cap 14 feed wires 16 and 17 extend. The feed wires just mentioned are connected to a suitable source of current 18 which may be turned on and off by the switch 19. In cold weather the current is turned on so that heat is applied and all parts of the device are warmed, and in addition heat effects the surface of the windshield 20 so that the scrapers 2 and 3 as well as the scrapers or scraping bars 4 and 5 may function in a more efficient manner.

After the extensions 11 have been coiled as shown in Fig. 3, the bar or casing 1 is applied whereby the respective parts are clamped together. At the lower edges of the casing or bar 1 there are provided hinged knuckles 21 and 22 through which the respective rods 23 and 24 rotatably extend. Each of the scraping members or bars 4 and 5 is provided with two ears 25 as shown in Fig. 4, and these ears may be dented into the respective bars 23 and 24 if desired as indicated at 26. If preferred these ears may be soldered, brazed or welded to the respective bars so that as these bars rock the blades or auxiliary scrapers 4 and 5 swing upwardly and downwardly. In order that these scraping blades may function in proper time each end of each of the bars 22 and 23 is bent down and formed with an eye 27 as shown in Figs. 3 and 4. Eyes 28 and 29 of the reciprocating bar 30 are fitted into the eyes 27. A retarding member 31 is firmly secured to the reciprocating bar 30. This retarding block may be rubber or other suitable material and may be vulcanized to the bar 30 or otherwise rigidly secured thereto so as to always move therewith.

When the device is moving in one direction, as for instance upwardly as indicated by the arrow 32, the scraping blades 2 and 3 will be engaging the surface of the windshield 20 and also the edge of blade 4 will be functioning. Upon the completion of the upward travel of the device it will reverse its movement and in doing so casing 1 and associated parts will stop and then start in a reverse movement. As the parts start in a reverse movement as just described, the rubber block 31 will adhere more or less to the windshield 20 and consequently will temporarily remain stationary, whereupon the return movement of bars 21 and 22 and associated parts will result in a swinging movement of these bars and consequently the raising of the scraper blade 4 and the lowering of scraper blade 5. The raising movement of blade 4 will cause the snow, water, etc. to be lifted upwardly or outwardly and consequently not to follow the return of blade 2. The reverse action takes place at the other extreme movement of the device. While the device may operate in a vertical plane and move upwardly or downwardly, it also will operate equally well in a horizontal movement or in a swinging or arc-shaped movement. It will be noted that the scraping blades 2 and 3 are always functioning while the blades 4 and 5 move upwardly and downwardly alternately.

From the foregoing it will be obvious that when the device is oscillated, or moved in opposite directions, the oppositely directed blades in contact with the surface to be cleaned will remove any matter adhering thereto, such as dust, dirt, or moisture, and that said edges will also serve to scrape the coating of frost or ice from the outer surface of a windshield while the device is in operation and heated by the means hereinabove referred to. It will also be obvious that the other objects of the invention mentioned hereinabove may be attained with a device having the features set forth.

I claim:

1. In a cleaning device of the character described, a pair of oppositely facing cleaning blades, a pair of auxiliary cleaning blades coacting with the first mentioned blades, and means for causing the auxiliary blades to swing toward and from the first mentioned blades.

2. A cleaning device of the character described comprising a casing, a pair of fixed scraping blades carried by the casing and formed with coiled members arranged within the casing, a heater arranged within each of the coiled members, a pair of swinging scraper blades carried by the casing, and means for swinging said blades into and out of operative position as the device reverses its movement during the functioning thereof.

3. A cleaning device for cleaning windshields and other flat surfaces comprising a pair of fixed scraper blades facing in opposite directions, a pair of heating elements coacting with said blades for warming the same, a casing for holding the parts together, an auxiliary scraper blade for each of the first mentioned scraper blades, and means engaging the surface being scraped for swinging the auxiliary scraper blades into and out of operative position.

4. A cleaning device for windshields or other surfaces including a pair of fixed scrapers facing in opposite directions, means for holding the scrapers in position, an auxiliary pivotally mounted scraper for each of the first mentioned scrapers, and friction means engaging the surface being scraped for alternately swinging the auxiliary scrapers into and out of functioning position as the device reverses its direction of travel.

5. A cleaning device for cleaning surfaces including a structure forming a body, a pair of scrapers hingedly connected with said body, an arm extending from each of said scrapers, a reciprocating bar pivotally connected with said arms and positioned so that the reciprocating bar will hold one scraper in non-functioning position while holding the other scraper in functioning position, and means connected with said arm engaging the surface being scraped for causing said bar to reverse the position of the scrapers upon each reverse movement of the cleaning device.

6. A cleaning device for cleaning flat surfaces including a pair of pivotally mounted scraping bars, an arm connected with each of said bars, said arms being positioned substantially parallel, a reciprocating bar pivotally connected at its respective ends to the respective bars and acting to hold one of the scrapers in operative position and the other scraper out of operative position, and a rubber friction member secured to said bar and engaging the surface being cleaned whereby when the direction of movement of the device is reversed the friction member will remain stationary a short time while the device moves in a reverse direction and thereby cause said reciprocating bar to function to swing one of said scrapers upwardly or outwardly and the other inwardly or downwardly.

7. A cleaning device for a windshield comprising a scraper structure formed with a pair of oppositely extending scraper blades, each blade having bendable spaced projecting members, a heating element resting on each of said blades adjacent the base of each of said bendable elements, each of said bendable elements being formed to snugly fit around respectively the respective heating elements, and a supporting and actuating bar fitting over and tightly engaging said bendable elements.

8. A windshield cleaner including a pair of scraping blades, each blade extending for the full length of the cleaner and positioned so their edges will be facing in opposite directions, a plurality of substantially tubular members extending from the contacting edges of the plates, a tubular heating element fitting into the respective tubular members and extending for substantially the full length of the device, and a supporting and actuating bar, said supporting and actuating bar being formed with a pair of curled edge portions partly surrounding and gripping said tubular members.

CHARLES R. SHANNON.